United States Patent [19]

Suh et al.

[11] 4,229,396

[45] Oct. 21, 1980

[54] METHOD OF EXTRUDING THERMOPLASTIC RESIN FOAMS HAVING ENLARGED CELL-SIZES

[75] Inventors: Kyung W. Suh, Granville, Ohio; Charles R. Amos, Auburn, Mich.

[73] Assignee: The Dow Chemical Company, Midland, Mich.

[21] Appl. No.: 22,579

[22] Filed: Mar. 21, 1979

[51] Int. Cl.² ............................................. B29D 27/00
[52] U.S. Cl. ..................................... 264/53; 264/211; 264/DIG. 13; 521/79; 521/82; 521/98
[58] Field of Search ................. 264/53, DIG. 13, 211; 521/79, 82, 98

[56] References Cited

U.S. PATENT DOCUMENTS

| | | |
|---|---|---|
| 2,409,910 | 10/1946 | Stober .................................... 264/53 |
| 2,515,250 | 7/1950 | McIntire . |
| 2,669,751 | 2/1954 | McCurdy et al. . |
| 2,848,428 | 8/1958 | Rubens . |
| 2,928,130 | 3/1960 | Gray . |
| 3,121,130 | 2/1964 | Wiley et al. ............................ 264/53 |
| 3,121,911 | 2/1964 | Lightner . |
| 3,351,569 | 11/1967 | Revallier et al. ............ 264/DIG. 13 |
| 3,770,668 | 11/1973 | Corbett et al. . |
| 3,812,225 | 5/1974 | Hosoda et al. ............... 264/DIG. 13 |
| 3,863,000 | 1/1975 | Kasai et al. .................. 264/DIG. 13 |
| 3,975,315 | 8/1976 | Parks ............................ 264/DIG. 13 |
| 3,996,171 | 12/1976 | Holland et al. .................... 264/53 X |

*Primary Examiner*—Philip Anderson
*Attorney, Agent, or Firm*—R. B. Ingraham

[57] ABSTRACT

Extruded synthetic resinous thermoplastic foams of increased cell size are obtained when using volatile fluid blowing agents by incorporating a cell-size enlarging agent into the extruded composition, the cell-size enlarging agent being liquid at the foaming temperature and generally soluble in the heat-plastified foamable mixture.

6 Claims, No Drawings

METHOD OF EXTRUDING THERMOPLASTIC RESIN FOAMS HAVING ENLARGED CELL-SIZES

Extruded synthetic resinous foams are highly desirable for many applications including thermal insulation, decorative purposes, packaging and the like. Oftentimes it is desirable to prepare such synthetic resinous foams which are dimensionally stable and have a relatively small cell size, for example 0.2 millimeters; however, for other purposes it is often desirable and necessary to have foams of substantially larger cell size, for example, one-half to one millimeter. Usually, in order to prepare a dimensionally stable foam, that is, a foam that does not shrink or increase in size on standing in air, it is desirable to avoid a foaming system that employs a fugitive blowing agent. By fugitive blowing agent is meant a blowing agent that diffuses from the polymer foam at a rate significantly faster than air can diffuse into the polymer foam. If such a fugitive blowing agent is employed, oftentimes foams prepared with such a blowing agent at desirable commercial densites will shrink after extrusion and may or may not re-expand to their original size. Generally, such dimensional changes will not occur rapidly and oftentimes are apparent only after a period of many days. For some applications, dimensional stability is not important, but for many applications dimensional stability is highly desirable. In order to obtain desired dimensional stability in foams, oftentimes the blowing agent used in the preparation of such foams is or contains a component of the desired volatility which has a low permeation rate through the cell walls of the foam, thereby avoiding a tendency to collapse on extrusion followed by slow partial re-expansion. A particularly desirable family of compounds for use in the preparation of extruded synthetic resinous thermoplastic foams are fluorine-containing carbon compounds which, in general, have the advantage of being thermally stable, exhibiting relatively low permeation rate through thermoplastics and excellent thermal properties for use as insulation. Such compounds generally exhibit a relatively low toxicity to mammals in sharp contrast to a commonly used blowing agent such as methyl chloride which is relatively toxic and in general diffuses through thermoplastics relatively rapidly. In many instances wherein plastic foam is prepared with methyl chloride as the sole blowing or expanding agent, special precautions must be taken with ventilation in areas where the foam is being cut and shaped. Methyl chloride is particualarly advantageous in preparing foams such as styrene polymer foams wherein a large cell size is desired. The fluorinated hydrocarbons exhibit the disadvantage of, in general, producing a foam having very small cell size.

It would be advantageous if there were available an improved process for the preparation of synthetic resinous thermoplastic extruded foams which exhibited desirably large cell size.

It would also be desirable if there were available an improved process for the preparation of synthetic resinous foams employing fluorinated hydrocarbon blowing agent which provided a foam having a desirably large cell size.

It would also be desirable if there were available such an improved process which also provided a foam of desirable dimensional stability.

These benefits and other advantages in accordance with the invention are achieved in a process for the preparation of a synthetic resinous thermoplastic extruded foam wherein a heat-plastified synthetic resinous gel containing a volatile fluid foaming agent, the gel being at a foaming temperature, the gel at the foaming temperature being expressed from a die into a region of reduced pressure, the reduced pressure being sufficient to permit the gel to expand into cellular form and cooling the gel to a temperature at which the gel is self-supporting, the improvement which comprises incorporating within the heat-plastified unfoamed gel, a cell-size enlarging agent, the cell-size enlarging agent being an organic compound which is liquid at the foaming temperature and atmospheric pressure and generally soluble in the gel at the foaming temperature, the cell size enlarging agent being present in an amount of from about 0.01 to 5 parts by weight per hundred based on the weight of the thermoplastic resin in the foamable gel.

The method of the present invention is applicable to all extruded synthetic resinous foamable compositions and is applied with particular benefit to styrene polymers and ethylene polymers. The extrusion of synthetic thermoplastic resinous compositions is well known and is described in the following U.S. Pat. Nos. 2,409,910; 2,515,250; 2,669,751; 2,848,428; 2,928,130; 3,121,130; 3,121,911 and 3,770,668 the teachings of which are herewith incorporated by reference thereto.

In the practice of the present invention, the cell-size enlarging agent may be incorporated in the foamable gel by a convenient means, for example, the cell-size enlarging agent may be mixed with the heat-plastified gel or blended with granular synthetic resinous polymer prior to being heat-plastified in the extruder. The cell-size enlarging agent may be added to the polymer before or after the addition of the volatile fluid foaming agent, either before or after the resinous material has been heat-plastified. Beneficially in a process wherein the volatile fluid foaming agent is being added to a heat-plastified gel within an extruder, the cell-size enlarging agent can be conveniently admixed with the blowing agent and both components added to the extruder simultaneously.

All known volatile fluid blowing or expanding agents are useful in the practice of the present invention. Cell-size enlarging agents useful in the practice of the present invention are organic materials which melt below the foaming temperature of the foamable composition employed. For example, the polystyrene foamable compositions foaming temperature generally ranges from about 115° to 125° C. and for foamable polyethylene compositions from about 100° to 110° C. The cell-size enlarging agent or composition appears to dissolve in the foamable composition at the foaming temperature. Typically, materials meeting these requirements are both natural and synthetic waxes. Such cell-size enlarging agents are generally employed in a proportion of about 0.01 to 5 parts by weight per hundred parts by weight of resin and beneficially from about 0.05 to 1.0 part by weight per hundred parts of resin by weight. Foams prepared by the method of the present invention generally are more dimensionally stable than like foams prepared without a cell-size enlarging material.

Some of the synthetic thermoplastic resins suitable for the practice of the present invention include: polystyrene, copolymers of styrene and acrylonitrile wherein the ratio of styrene to acrylonitrile is about three to one, polyvinyl chloride, vinylidene chloride resins such as a copolymer of 80 parts by weight vinylidene chloride at 20 parts by weight acrylonitrile and 75 parts by weight vinyl chloride, 25 parts by weight vinylidene chloride, polyolefin resins such as polyethylene, a copolymer of 85 parts by weight ethylene, 15 parts by weight vinyl acetate, a copolymer of 70 parts by weight ethylene, 30 parts by weight ethylacrylate and the like.

The invention is illustrated but not limited by the following examples.

EXAMPLE 1

A plurality of materials were evaluated for cell-size enlarging capability by introducing 100 parts by weight of polystyrene into a glass ampule, adding 45 parts by weight of a one-to-one by weight mixture of methyl chloride and dichloro-difluoro methane, the ampule being cooled to dry ice temperature, sealed and permitted to warm to ambient temperature whereupon the ampule is heated to a temperature of 200° C. in an oil bath for a period of two to three hours until the polymer had melted and a homogeneous mixture was obtained in the ampule. The ampule was then cooled to the foaming temperature of 125° C. for a period of about five to ten minutes. The glass ampule was then ruptured to permit foaming polymer to extrude therefrom. In most cases the foam density was reported in pounds per cubic foot and the cell-size determined by ASTM method D 2842-69. The cell-size enlarging agent was present in a proportion of one-half part by weight per one-hundred parts by weight of polystyrene. The polystyrene had a weight average molecular weight of about 200,000 as determined by gel permeation chromatography. The results are set forth in Table I.

TABLE I

| Cell-Size Enlarging Agents | Melting Point (°F.) | Foam Density (pcf) | Cell Size (mm) |
|---|---|---|---|
| Control (No additive) | — | 1.30 | 0.20 |
| Ross Refined Ouricury wax | 180~184 | 1.57 | 1.42 |
| Ross Montan wax | 185~190 | 1.49 | 1.14 |
| Ross Candelilla wax | 155~162 | 1.40 | 0.50 |
| Ross Refined Carnauba wax No. 120 | 180~187 | 1.48 | 0.37 |
| 50 Ross Refined Carnauba wax No. 120/50 Ross Candelilla wax | — | 1.26 | 1.10 |
| Ross Japan wax substitute 1708/2 | 127~133 | 1.41 | 0.35 |
| Ross Refined Paraffine wax 133/35 | 128~165 | 1.40 | 0.34 |
| Ross Ceresine wax 1670 | 138~148 | 1.50 | 0.35 |
| Petrolite C-400 wax | 215~225 | 1.40 | 0.41 |
| Ceramer 67 wax | 200~215 | 1.49 | 0.75 |
| Deriphat 154 wax | 220~230 | 1.21 | 0.83 |

All cell size enlarging agents had a concentration of 0.05% unless otherwise stated.

EXAMPLE 2

A plurality of cell-size enlarging agents were evaluated in polystryene employing a 2¼ inch extruder under the following operating conditions: die pressure 500–600 psi, foaming temperature 105°—125° C., pentabromocyclohexane 3 parts per hundred of resin, cell-size control agent was incorporated at varying levels. The results are set forth in Table II.

TABLE II

Examples of Extrusion process for Polystyrene Foam

| *CSEA | Control | Candelilla Wax | Candelilla Wax | Candelilla Wax | Ceramer 67 Wax | Ceramer 67 Wax | Control | Petrolite C-400 Wax | Petrolite C-400 Wax |
|---|---|---|---|---|---|---|---|---|---|
| CSEA rate (pph) | 0 | 0.1 | 0.2 | 0.3 | 0.075 | 0.15 | 0 | 0.05 | 0.1 |
| Blowing agent type | 22 FC-31/ 78 FC-12 | 22 FC-31/ 78 FC-12 | 22 FC-31/ 78 FC-12 | 22 FC-31/ 78 FC-12 | 22 FC-31/ 78 FC-12 | 22 FC-31/ 78 FC-12 | 50 methyl chloride 50 FC-12 | 50 methyl chloride 50 FC-12 | 50 methyl chloride 50 FC-12 |
| Blowing agent rate (pph) | 17.25 | 16.25 | 16.0 | 16.25 | 16.25 | 16.25 | 10.0 | 10.0 | 10.0 |
| Foam Density (pcf) | 2.02 | 1.92 | 1.95 | 1.91 | 1.82 | 1.80 | 1.99 | 1.96 | 1.90 |
| Cell size (mm) | 0.27 | 0.85 | 0.91 | 0.88 | 0.99 | 1.20 | 0.49 | 0.45 | 0.79 |
| Heat distortion temp. (°F.) | 180 | 180 | 180 | 180 | 180 | 180 | 180 | 180 | 180 |
| Compressive Strength (psi) | | | | | | | | | |
| Vertical | 43.3 | 35.9 | 36.3 | 33.2 | 29.5 | 27.7 | 49.9 | 54.9 | 35.7 |
| Hortizontal | 27.2 | 26.0 | 24.8 | 25.4 | 21.0 | 19.9 | 20.2 | 17.9 | 21.0 |
| Extrusion | 30.6 | 20.8 | 20.7 | 21.5 | 13.8 | 13.5 | 19.2 | 19.1 | 16.2 |

*Cell-Size Enlarging Agent
monochloropentabromocyclohexane rate - 3.0 pph
Die pressure = 600 psi

EXAMPLE 3

The procedure of Example 2 was repeated wherein two samples were prepared, one without candelilla wax and one containing one-tenth of a part by weight per 100 parts per weight of the polystyrene. The mixture also contained two parts per 100 of an ignition retardant (monochloropentabromocyclohexane). The foaming temperature varied from about 104° to 100° C. and the die pressure from 640 to 700 pounds/square inch. The blowing agent employed was 90 parts by weight methyl chloride and 10 parts by weight of dichlorodifluoromethane. The blowing agent was fed at a rate of about 11 parts by weight per 100 parts by weight of resin. Machineability of the samples was determined by employing a router blade. The blade had a total width of 3 and 3/32 of an inch, a depth of 2 and ¼ inches and formed a concave semi-circular recess in one major edge having a radius of about 1 and ¼ inches. The blade is 1/16 of an inch in thickness and cutting edges are beveled 3/32 of an inch. On rotation of the blade in foam, a cylindrical cavity was routed having a hemisphere protruding into the bottom thereof. The cutter was used in a drill press with a spindle rotation of 4250 revolutions per minute. The quality of the cut was judged by inspecting the freshly cut surface. The density of the foam that did not contain candelilla wax was 1.71 pounds per cubic foot. The cell size was measured to be 0.98 millimeter. The machineability of the foam was poor. The sample that contained one-tenth part by weight candelilla wax had a density of 1.81 pounds per cubic foot, a cell size of 1.47 millimeters and on evaluation for machineability was found to be good.

EXAMPLE 4

The apparatus of Example 2 was employed to prepare two polystyrene foams: one containing one-tenth part by weight of candelilla wax and the other containing no candelilla wax. In each case, generally identical extrusion conditions were employed and the blowing agent was a 90/10 mixture by weight of methyl chloride and dichloro-difluoro methane. Also included in each of the foams was two parts by weight of the ignition retardant materials of Example 3. The foaming temperature was from about 104° to about 110° C. and die pressure 600 to 700 pounds per square inch. Conditions and physical properties of the two foams are set forth in Table III.

TABLE III

| Candelilla Wax | 0.1 | 0 |
|---|---|---|
| Blowing Agent type | 90 methyl chloride/ 10 $CCl_2F_2$ | 90 methyl chloride/ 10 $CCl_2F_2$ |
| Blowing Agent rate (pph) | 11.25 | 11.5 |
| Foam Density (pcf) | 1.81 | 1.70 |
| Cell size (mm) | 1.47 | 1.02 |
| Heat distortion temp. (°F.) | 160 | 165 |
| Compressive Strength (psi) | | |
| Vertical | 21.4 | 33.9 |
| Horizontal | 20.6 | 22.3 |
| Extrusion | 25.6 | 20.6 |
| *Distortion pressure (psig) | | |
| Aging time = 0 day | 17.3 | 16.1 |
| 11 days | 14.9 | 12.4 |
| 18 days | 15.4 | 13.9 |
| 38 days | 18.2 | 18.2 |
| Stability value (psig) | 2.4 | 3.7 |
| Barium stearate rate = 0.075 pph | | |
| Magnesium oxide rate = 0.015 pph | | |
| FR-651A = 2.0 pph | | |
| Foaming temperature = 104 ~ 110° C. | | |
| Die pressure = 600 ~ 700 psi | | |

*The distortion pressure of a foam was determined by placing a 2-inch thick full cross-section of the foam being tested in a pressure chamber and the amount of air pressure required to distort or collapse the sample ⅛ of an inch in the extrusion direction in a period of 2 minutes is determined. Fresh samples are employed for each determination. Generally such determinations are carried out at intervals over a period of about 40 days. The stability value for the foam is obtained by substracting the minimum distortion pressure obtained in the periodic measurements of the foam from the distortion pressure at time zero. The smaller this value, in general, the more stable the foam.

EXAMPLE 5

Samples of polyethylene foam prepared from a polyethylene having a melt index of 2.3 and a copolymer of ethylene and vinyl acetate containing 82 weight percent ethylene and 18 percent vinyl acetate were prepared with and without candelilla wax in a 3½ inch extruder at a rate of 200 pounds per hour. The composition, operating conditions and physical properties of the foams obtained are set forth in Table IV.

TABLE IV

Examples for Polyethylene Extrusion Process

| Polymer | Low density polyethylene (MI = 2.3) | | 82% ethylene/18 vinyl acetate (MI = 2.5) | |
|---|---|---|---|---|
| Candelilla wax* level (pph) | 0 | 0.2 | 0 | 0.2 |
| Blowing agent type | 75 $CCl_2F_2$ 25 $C_2ClF_5$ | 75 $CCl_2F_2$ 25 $C_2ClF_5$ | 60 $CCl_2F_2$ 40 $C_2ClF_5$ | 60 $CCl_2F_2$ 40 $C_2ClF_5$ |
| Blowing agent level (pph) | 18.5 | 18.5 | 24.5 | 24.5 |
| Talc level (pph) | 0.3 | 0.3 | 0 | 0 |
| Foam density (pcf) | 2.42 | 2.53 | 2.45 | 1.95 |
| Average cell size (mm) | 0.99 | 1.34 | 0.57 | 1.08 |
| Foam shape[1] | ⊂⊃ | ⊂⊃ | ∽ | ⊂⊃ |
| % open cel | 20 | 18.8 | 30.4 | 23.7 |
| Compressive Strength (psi) at 25% deflection | | | | |
| Vertical | 9.1 | 8.4 | 2.7 | 3.7 |
| Horizontal | 6.8 | 8.0 | 3.1 | 3.3 |
| Extrusion | 11.7 | 11.8 | 3.3 | 4.3 |
| Heat Stability | | | | |
| % volume change at 180° F. | 3.29 | 4.63 | — | — |
| at 160° F. | — | — | −11.6 | −10.3 |
| Die pressure (psi) | 340 | 355 | 365 | 370 |
| Foaming temperature (°C.) | 105 | 105 | 85 | 85 |

*The candelilla wax was added as a 3% concentrate in the same base polymer.
[1]Approximate cross section.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for the preparation of a synthetic resinous thermoplastic extruded foam wherein a heat-plastified synthetic resinous gel containing a volatile fluid foaming agent, the gel being at a foaming temperature, the gel at the foaming temperature being expressed from a die into a region of reduced pressure, the reduced pressure being sufficient to permit the gel to expand into cellular form and cooling the gel to a temperature at which the gel is self-supporting, the improvement which comprises incorporating within the heat-plastified unfoamed gel, a cell-size enlarging agent, the cell-size enlarging agent being an organic compound which is liquid at the foaming temperature and atmospheric pressure and generally soluble in the gel at the foaming temperature, the cell-size enlarging agent being present in an amount of from about 0.01 to 5 parts by weight per hundred based on the weight of the thermoplastic resin in the foamable gel.

2. The method of claim 1 wherein the cell-size enlarging agent is a wax.

3. The method of claim 1 wherein the cell-size enlarging agent is present in a proportion of about 0.05 to 1.0 part by weight per hundred parts of the thermoplastic resin.

4. The method of claim 1 wherein the resin is a styrene polymer.

5. The method of claim 1 wherein the resin is an ethylene polymer.

6. The method of claim 1 wherein the resin is an ethylene-vinyl acetate copolymer.

* * * * *